(12) United States Patent
Price et al.

(10) Patent No.: US 11,479,135 B2
(45) Date of Patent: Oct. 25, 2022

(54) CHARGING STATION AND SYSTEM FOR ELECTRIC VEHICLES

(71) Applicant: Chargicity Limited, Dublin (IE)

(72) Inventors: Marcus Price, Dublin (IE); Andrew Frame, County Dublin (IE)

(73) Assignee: Chargicity Limited, Dublin (IE)

( * ) Notice: Subject to any disclaimer, the term of this patent is extended or adjusted under 35 U.S.C. 154(b) by 0 days.

(21) Appl. No.: 17/176,178

(22) Filed: Feb. 15, 2021

(65) Prior Publication Data
US 2021/0252989 A1    Aug. 19, 2021

(30) Foreign Application Priority Data
Feb. 17, 2020 (EP) ..................................... 20157601

(51) Int. Cl.
*B60L 53/30*    (2019.01)
*B60L 53/31*    (2019.01)

(52) U.S. Cl.
CPC ............. *B60L 53/305* (2019.02); *B60L 53/31* (2019.02)

(58) Field of Classification Search
CPC .............................. B60L 53/305; B60L 53/31
USPC ....................................................... 320/107
See application file for complete search history.

(56) References Cited

U.S. PATENT DOCUMENTS

| | | | |
|---|---|---|---|
| 9,446,676 B2 | 9/2016 | Reinschke | |
| 9,543,769 B2 | 1/2017 | Kauffmann | |
| 2013/0113425 A1* | 5/2013 | Kauffmann | H02J 7/0042 320/109 |
| 2013/0307477 A1* | 11/2013 | Reinschke | B60L 53/14 320/109 |
| 2016/0185243 A1* | 6/2016 | Zhou | H01M 50/20 180/68.5 |
| 2016/0207406 A1* | 7/2016 | Kauffmann | B60L 53/30 |
| 2021/0053456 A1* | 2/2021 | Freeling-Wilkinson | B60L 53/31 |
| 2022/0009364 A1* | 1/2022 | Weisshar | B60L 53/16 |

FOREIGN PATENT DOCUMENTS

| | | |
|---|---|---|
| CN | 105896669 A | 8/2016 |
| CN | 106926727 A | 7/2017 |
| CN | 107364362 A | 11/2017 |
| CN | 107415751 A | 12/2017 |

(Continued)

*Primary Examiner* — Suchin Parihar
(74) *Attorney, Agent, or Firm* — LaMorte & Associates PC.

(57) ABSTRACT

A charging station for charging a battery of an electric vehicle including: a main body having a base portion positioned in a substructure and a charging portion, the charging portion includes an electrical outlet for connection to the electric vehicle; lifting means for moving the charging portion between a first position in which the charging portion is located in the base portion and a second position in which the charging portion is in a raised location out of the base portion and above the substructure; a lifting controller to activate the lifting means to move the charging portion between the first position and second position. The charging station is operable to charge the vehicle when the charging portion is in the first position within the base portion. The present invention also relates to a charging system for an electric vehicle including one or more charging stations, and a control panel to provide user operated control via a user interface to facilitate access to and use of the one or more charging stations.

14 Claims, 12 Drawing Sheets

(56) References Cited

FOREIGN PATENT DOCUMENTS

| CN | 206938477 U | 1/2018 |
|---|---|---|
| CN | 208411456 U | 1/2019 |
| CN | 208615738 U | 3/2019 |
| DE | 102017221059 A | 5/2019 |
| GB | 2567629 A | 4/2019 |
| WO | WO 2017/061863 A1 | 4/2017 |
| WO | WO 2018/226109 | 12/2018 |
| WO | WO 2019/073271 A1 | 4/2019 |
| WO | WO 2019/215423 A1 | 11/2019 |

* cited by examiner

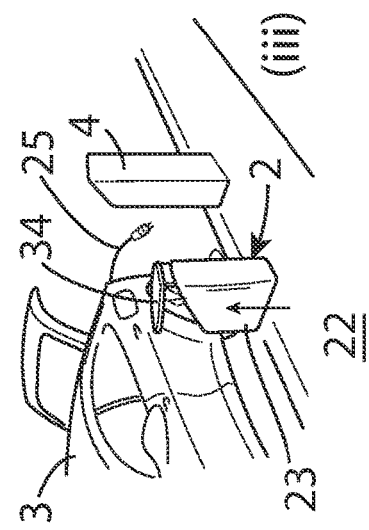
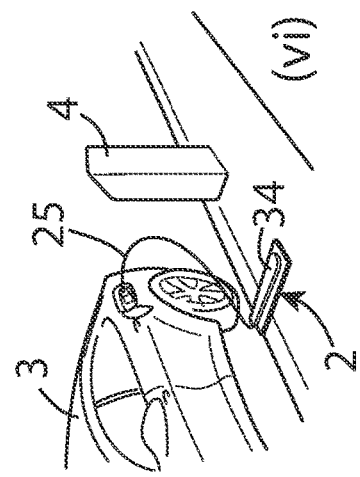
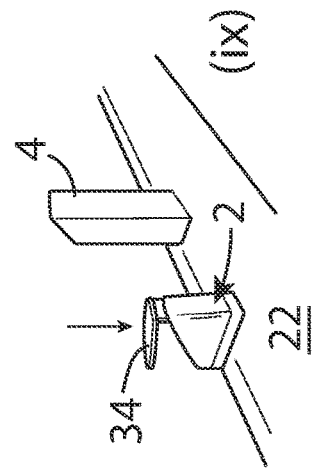
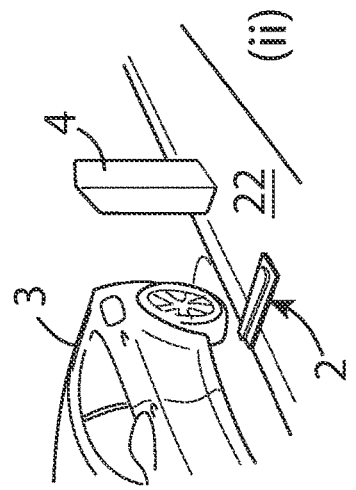
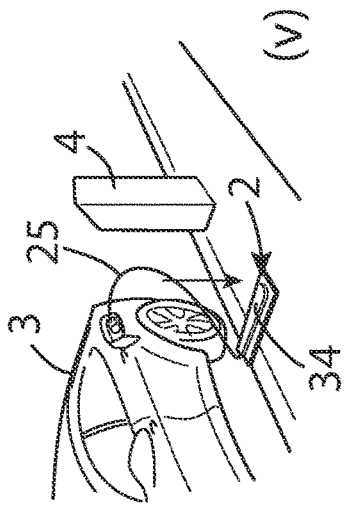
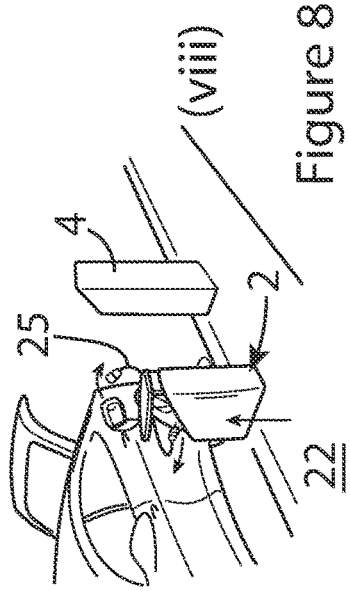
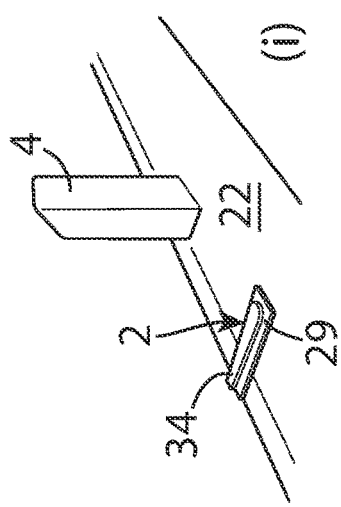
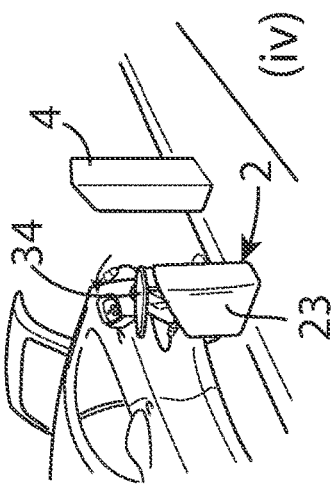
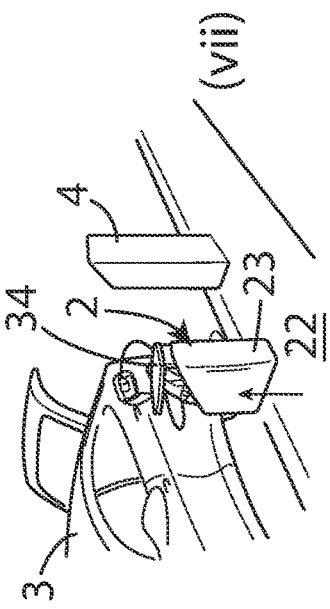
Figure 8

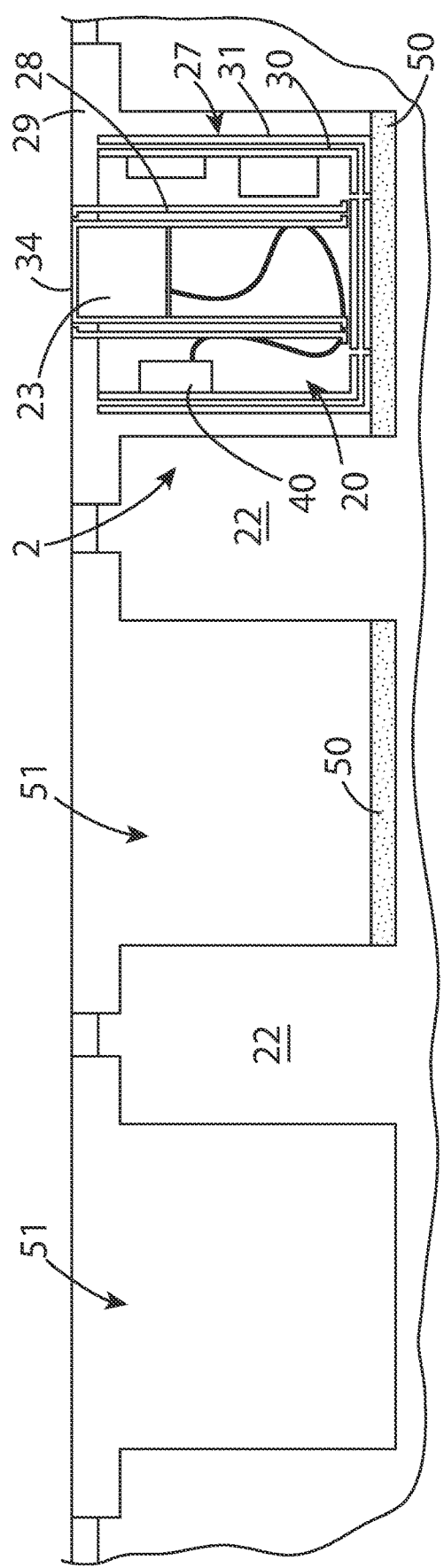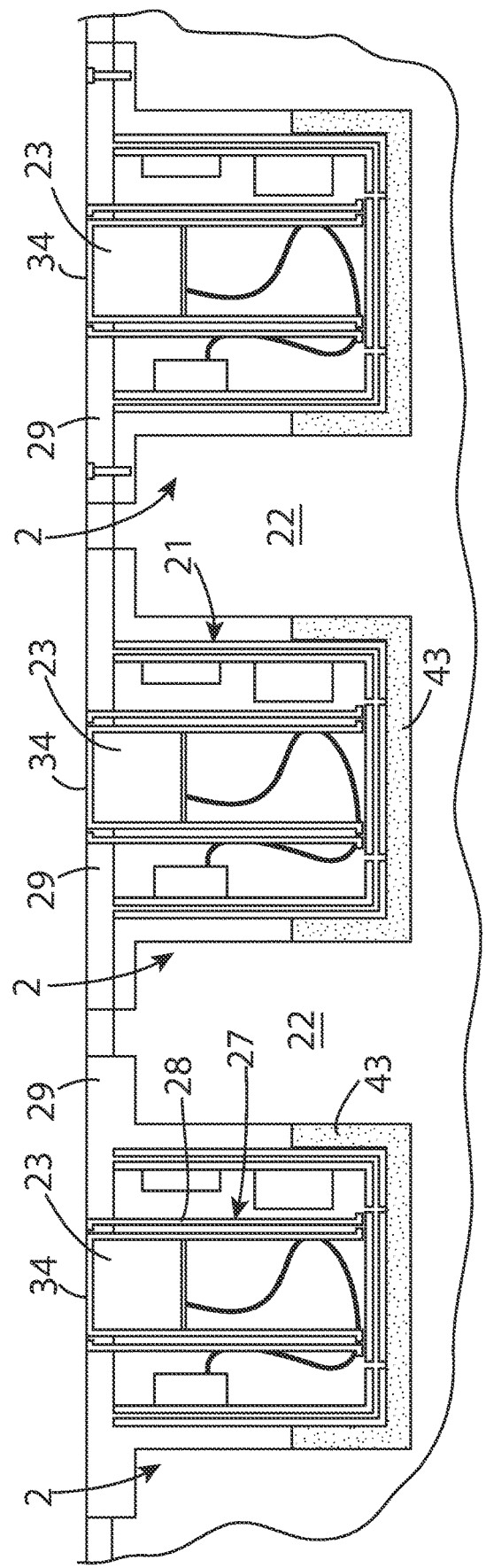
Figure 9

CHARGING STATION AND SYSTEM FOR ELECTRIC VEHICLES

BACKGROUND OF THE INVENTION

1. Field of the Invention

The present invention relates to a charging station and system for charging electrically powered vehicles, such as, although not limited to, electrically and/or hybrid powered (i.e. electrical with another form of power, such as petrol, diesel) passenger cars, bicycles, scooters, trucks, boats and the like.

2. Prior Art Description

Charging stations for electrical or hybrid powered vehicles are commonly located on roadways, including city and suburban streets and on motorways, at traditional petrol and diesel refuelling filling stations, and in car parking facilities.

Such charging stations are provided as fixed structures including an upright housing or pillar providing a socketed connection to a power supply. A charging cable with a plug at each end is usually stored in the boot or trunk of the vehicle and is operable to be plugged into the socket provided on the pillar and into a receiving input socket of the vehicle to enable current to flow and the vehicle to be charged as required.

However, such electrical charging stations are problematic since they often pose a physical obstacle and are optically obtrusive.

It is an object of the present invention to provide a charging station and system for charging electrically powered vehicles that goes at least some way toward overcoming the above problem and/or that will provide the public and/or industry with a useful alternative.

Further aspects of the present invention will become apparent from the ensuing description which is given by way of example only.

SUMMARY OF THE INVENTION

According to the invention, there is provided a charging station for charging a battery of an electric vehicle including:

a main body having a base portion positioned in a substructure and a charging portion, the charging portion includes an electrical outlet for connection to the electric vehicle, lifting means for moving the charging portion between a first position in which the charging portion is located in the base portion and a second position in which the charging portion is in a raised location out of the base portion and above the substructure, a lifting controller to activate the lifting means to move the charging portion between the first position and second position, wherein the charging station includes a control panel to provide user operated control via a user interface to facilitate access to and use of the one or more charging stations, and the lifting controller of a charging station is operable in response to signals from the control panel to activate the lifting means to move the charging portion of the or each charging station from the first position to the second position fully above the substructure to provide access to the electrical outlet, and from the second position to the first position and to activate the charging station to charge the vehicle when the charging portion is in the first position within the base portion.

Connection to the electric vehicle for charging is by an electric charging cable that is plugged into the outlet of the charging portion and charging of the vehicle starts when the charging cable is plugged into the outlet. The electric cable may optionally be double ended and plugged into both the electrical outlet of the charging portion and a charging socket of the electric vehicle to enable the battery of the vehicle to be charged.

Alternatively, the electric cable may be connected to and extend from the charging portion and plugged into the vehicle, or the other way around (i.e. extend from the vehicle and be plugged into the electrical outlet of the charging portion).

Charging of the vehicle while the charging portion is in the first position within the main body and below the surface of the substructure ensures that the charging station does not present a physical obstacle and is not optically obtrusive during charging of a vehicle. Movement of the charging portion to the second position above the substructure facilitates access to the electrical outlet of the charging portion so that the charging cable may be plugged into and removed from the outlet.

The charging portion then moves from the second position back to the first position to charge the vehicle. The charging portion also moves from the second position back to the first position subsequently when a charging cycle has been completed and the electric charging cable is removed from the vehicle and the charging station is not in use and the charging portion is stowed below the level of the substructure or footpath.

It will be understood that movement of the charging portion from the first position below the surface level of the substructure to the second position above the substructure to facilitate access to the electrical outlet is electrically and automatically controlled by the lifting controller. Movement of the charging portion from the second position back to the first position below the substructure during charging or after removal of the charging cable when a charging cycle is completed is also electrically and automatically controlled by the lifting controller. The present invention therefore does not require any manual intervention by a user to engage physically with the charging portion to move or pull or lift or pivot it at or above the ground level to facilitate access to the charging outlet, or to return the charging portion back below the substructure level for charging or after a vehicle battery has been charged when not in current use.

Accordingly, all movement of the charging portion and housing for the charging portion is controlled by electrical signals and is not dependent on any direct physical manual user interaction with the charging portion or housing.

Preferably, in the first position the charging station is substantially flush with the substructure such that no part of the charging station is above the surface of the substructure.

Preferably, the charging portion is moved to the second position in response to user input provided to a user interface to cease charging the vehicle.

In the first position, in which the charging portion is located in the base portion, the charging station is substantially flush with the roadway, ground, pavement, walkway etc., and does not exhibit a physical obstacle that extends above the surface of the ground.

Preferably, the charging portion moves to the second position in a housing. The housing includes a cover, whereby the cover is flush with the substructure when the charging portion is in the base portion in the first position. The housing is provided as a telescoping pillar or column operable under the action of the moving means to extend from the base portion when the charging portion is in the second position.

The housing moves in a substantially vertical direction upward from the base portion.

Preferably, the housing includes an arrangement of interfitting nested shell structures operable to collapse into one another as the charging portion is moved from the second position to the first position.

The housing and charging portion are stored in the base portion within the substructure when the charging portion is in the first position.

Preferably, the base portion includes an inner housing and an outer housing, and the inner housing is removably connected to the outer housing within the substructure.

Preferably, the lifting means is provided as a hydraulic cylinder, and more preferably, a telescopic hydraulic cylinder.

In alternative embodiments the lifting means may be provided as a telescopic pneumatic cylinder, a scissor lift, rack and pinion, a rigid chain link mechanism or some other lifting device or combination thereof. Accordingly, reference to the lifting means being provided as a telescopic hydraulic cylinder should not be seen as limiting.

Preferably, the housing includes a lid operable when open to provide access to the electrical outlet of the charging portion.

A lid closure sensor is operable to detect that the lid is closed, and the charging portion will start lowering and charging when the lid has been detected as being closed.

Optionally, a wireless charging pad may be provided in place of or in addition to the lid or cover of the charging station to facilitate wireless charging of the vehicle. In practice, the present invention may therefore be adapted for wireless charging so that a charging cable is not required.

Preferably, a force sensor or proximity sensor is provided to detect if an obstacle is positioned above or on the charging station, whereby if an obstacle is detected then the charging portion is not moved from the first position to the second position. Such a force sensor may optionally be provided on the lid.

Alternatively, or additionally, a force sensor may be provided on the pump to the hydraulic cylinder to detect when the force required to move the charging pump to the second position is abnormal, indicating a fault or obstruction.

An alert may optionally be displayed on the control panel asking the user if the charging station is clear to rise.

Preferably, the charging station includes a water sensor, whereby when water is detected, (such as during rain fall, a flooding event or some other water/moisture related event) the lifting controller is operable to move and/or maintain the charging portion in the second position above the substructure and the charging controller is automatically operable without user intervention or user input to activate the charging station to charge the vehicle when the charging portion is in the second position.

The water sensor will therefore detect when the main body of the charging station is receiving water, and when activated, the charging portion will rise to avoid the electrical outlet being in contact with or submerged in water.

Preferably, a water pump is provided and is operable to pump out and remove water from within the main body of the charging station.

Preferably, drain holes are provided in the base portion to enable water to drain out of the charging station.

In another embodiment, there is provided an electric vehicle charging system including one or more charging stations and a control panel to provide user operated control to facilitate access to and use of a charging station.

Preferably, the control panel includes an interactive user interface. The interactive user interface may be provided at a fixed structure, such as a pillar, located near the charging station or on an application executing on a computer processor enabled device, such as a laptop, smart mobile phone, computer tablet or pad, or other suitable device.

The lifting controller of a charging station is operable in response to signals from the control panel to activate the lifting means to move the charging portion of the charging station between the first position and second position and to activate the charging station.

In operation, each charging station may be provided with an identifier, such as a number, and a user may interact with the interactive user interface to select a specific charging station by keying in the identifier to thereby activate the station.

The user interface includes a payment option to enable users to pay for the charging facility.

Preferably, a control panel provided on a fixed structure, such as a pillar, includes payment facilities, such as contactless, card and coin/cash options to pay for the charging facility. A user may also hold a dedicated user account to facilitate payment or use online payment options, such as with a debit or credit card.

Preferably, each charging station includes a visible indicator which changes colour to show that charging of a vehicle has begun when the charging cable of the vehicle is plugged into the electrical outlet of the charging station.

The control panel may be communicatively coupled to the or each charging station wirelessly and/or via a wired connection so that wireless signals and/or wired signal communications may be sent and received between the control panel, the or each charging station and computer processor enabled devices, such as a laptop, smart mobile phone, computer tablet or pad, or other suitable device operated by a user. Wireless signals may be provided by one or more of Bluetooth, RFID, WIFI, near field communications, SMS or other known communications methods in the art.

BRIEF DESCRIPTION OF THE DRAWINGS

The invention will be more clearly understood from the following description of some embodiments thereof, given by way of example only, with reference to the accompanying drawings, in which:

FIG. 8 illustrates a charging system and a charging station in use according to the invention;

FIG. 9 is a sectional diagrammatic showing the installation of the charging station according to the invention.

DETAILED DESCRIPTION OF THE INVENTION

Figure 1:
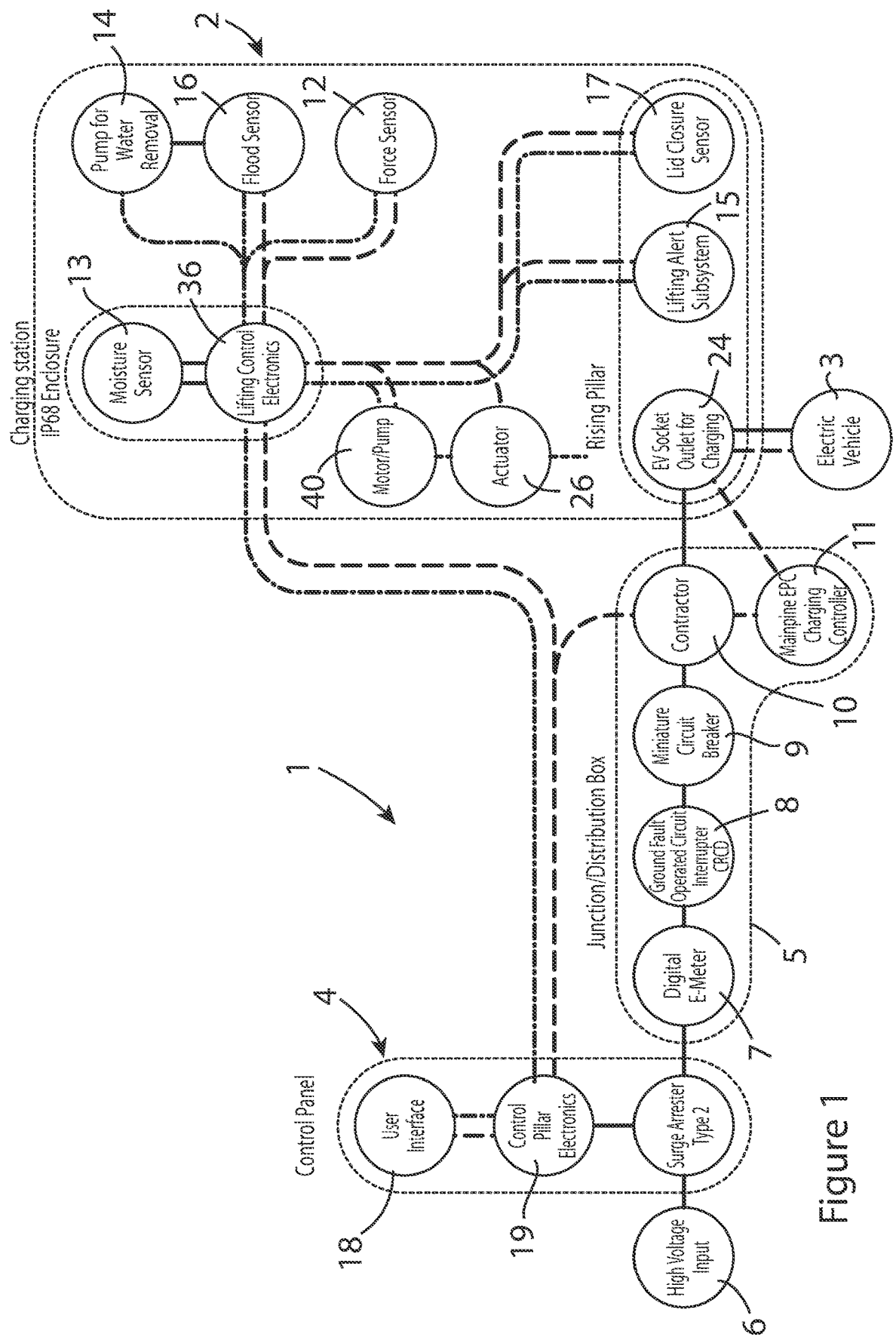
FIG. 1 is a schematic of a charging system and charging station according to the invention.

Referring to the drawings, and initially to FIG. 1, there is shown a charging system, indicated generally by the reference numeral 1, including one or more charging stations, indicated generally by the reference numeral 2, for charging a battery of an electric vehicle 3. Although a single charging station 2 is shown in FIG. 1, it will be understood that the system 1 may comprise a plurality of such charging stations 2, and reference to one charging station only in FIG. 1 is by way of example only and should in no way be seen as limiting.

The charging system 1 includes a main control panel 4 to provide user operated control to facilitate access to and use of a charging station 2. Also provided is junction or electrical power distribution box, indicated generally by the reference numeral 5, for housing electrical connections and wiring for coupling mains power 6 to the or each charging station 2 to thereby provide the required electrical supply to power the or each charging station 2. Connection to the local electrical grid (mains power source) is thus provided through the substructure 22 to the or each charging station 2. The junction or electrical power distribution box 5 may be located within a charging station 2, within the control panel 4, or at another practical location in the vicinity of the charging station as required or as desired. In the embodiment shown the junction power distribution box 5 includes elements including a digital e-meter 7, ground fault operated circuit interrupter means 8, circuit breaker 9, contactor means 10 for coupling to the charging station 2 and a charging controller 11 to regulate and provide power supply to the charging station 2 to charge the vehicle 2.

As shown in FIGS. 2 to 7, the charging station 2 includes a main body, indicated generally by the reference numeral 20, having a base portion 21 positioned in a substructure 22 and a charging portion, indicated generally by the reference numeral 23. The substructure will be understood to be a footpath, roadway, floor, driveway or a walkway in a car parking facility, filling station or the like, such substructures being typically formed by gravel, paving, earth and similar means providing a surface.

The base portion 21 of the main body 20 includes an inner housing 30 and an outer housing 31, whereby the inner housing 30 is removably connected to the outer housing 31 within the substructure 22.

The charging portion 23 of the main body 20 includes an electrical outlet 24 for connection to the electric vehicle 3. A double ended electric cable 25 is plugged into the electrical outlet 24 of the charging portion 23 and a charging socket of the electric vehicle 3 to enable the battery of the vehicle 3 to be charged.

Also shown is lifting means 26 for moving the charging portion 23 between a first position in which the charging portion 23 is located in the base portion 21 and a second position in which the charging portion 23 is located out of the base portion and fully above the substructure 22. The charging station 2 is operable to charge the vehicle 3 when the charging portion 22 is in the first position retracted within the base portion 21.

In the first position the top of the charging station 2 is substantially flush with the substructure 22 and it be apparent that no part of the charging station 2 is above the surface level of the substructure 22 when the charging portion 24 is in the base portion 21.

Figure 2:
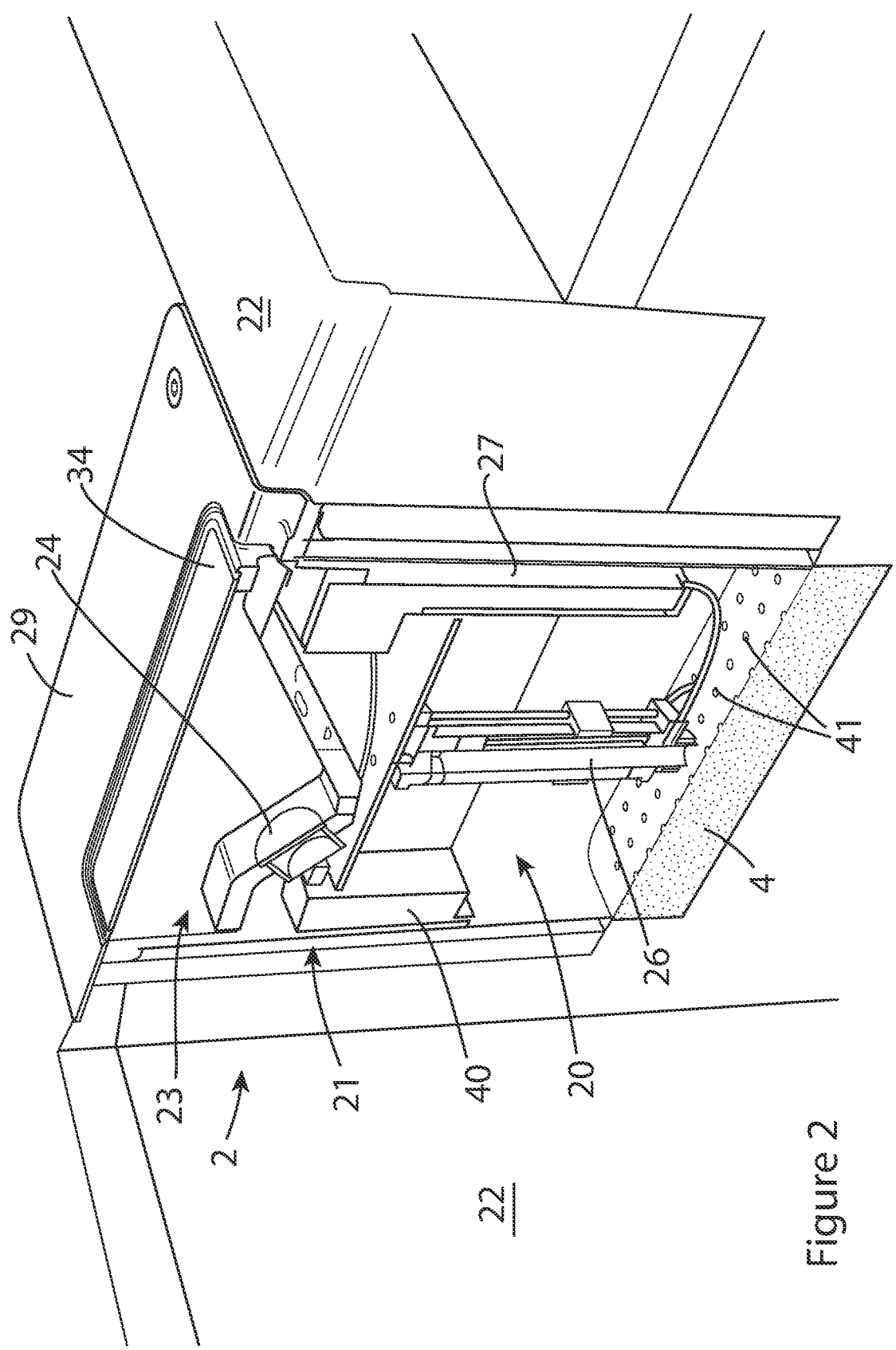
FIG. 2 is a sectional diagrammatic of a charging station provided in a substructure according to the invention.
Figure 3:
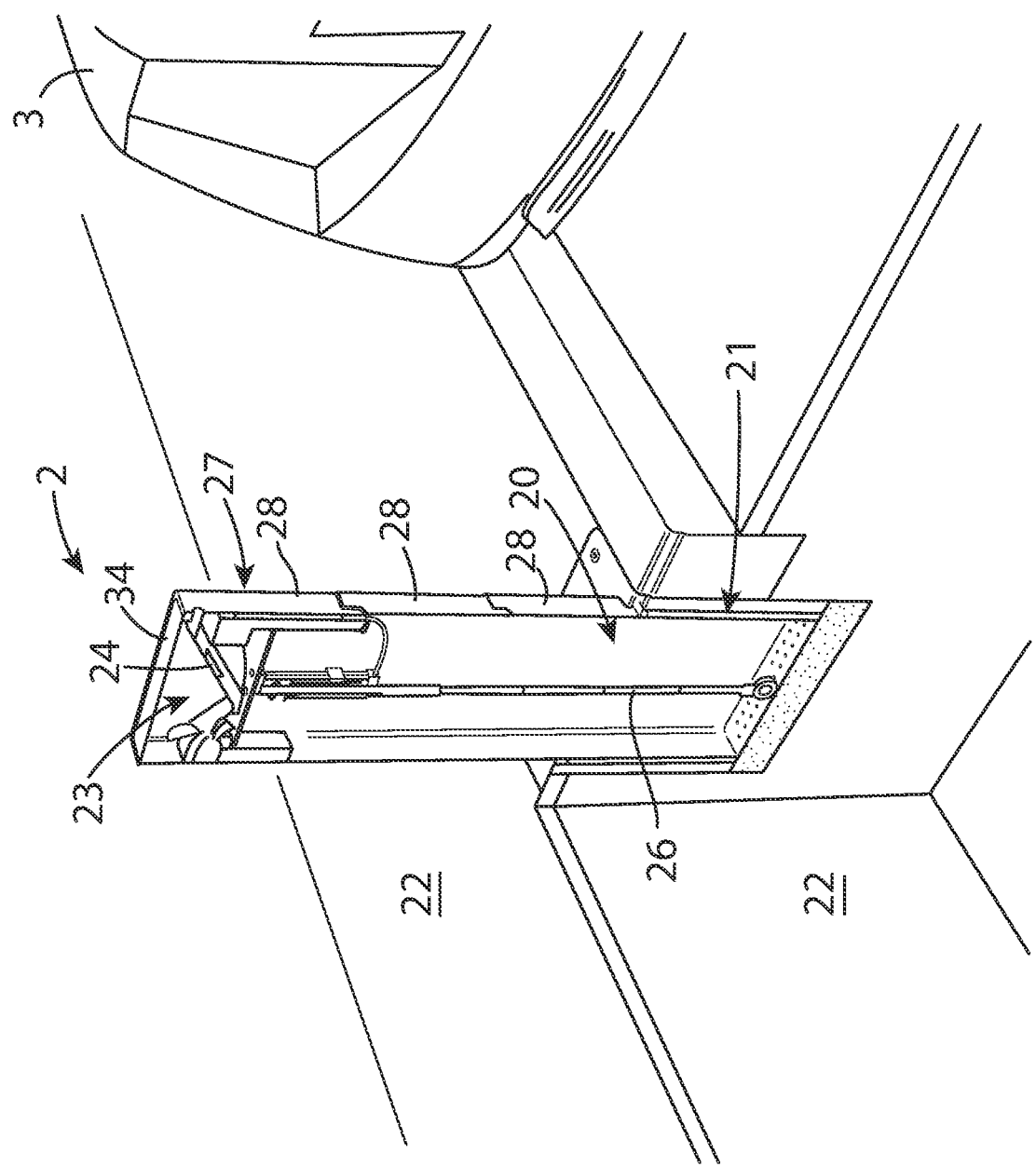
FIG. 3 is the charging station shown in FIG. 2 showing the main body in an extended configuration.
Figure 4:
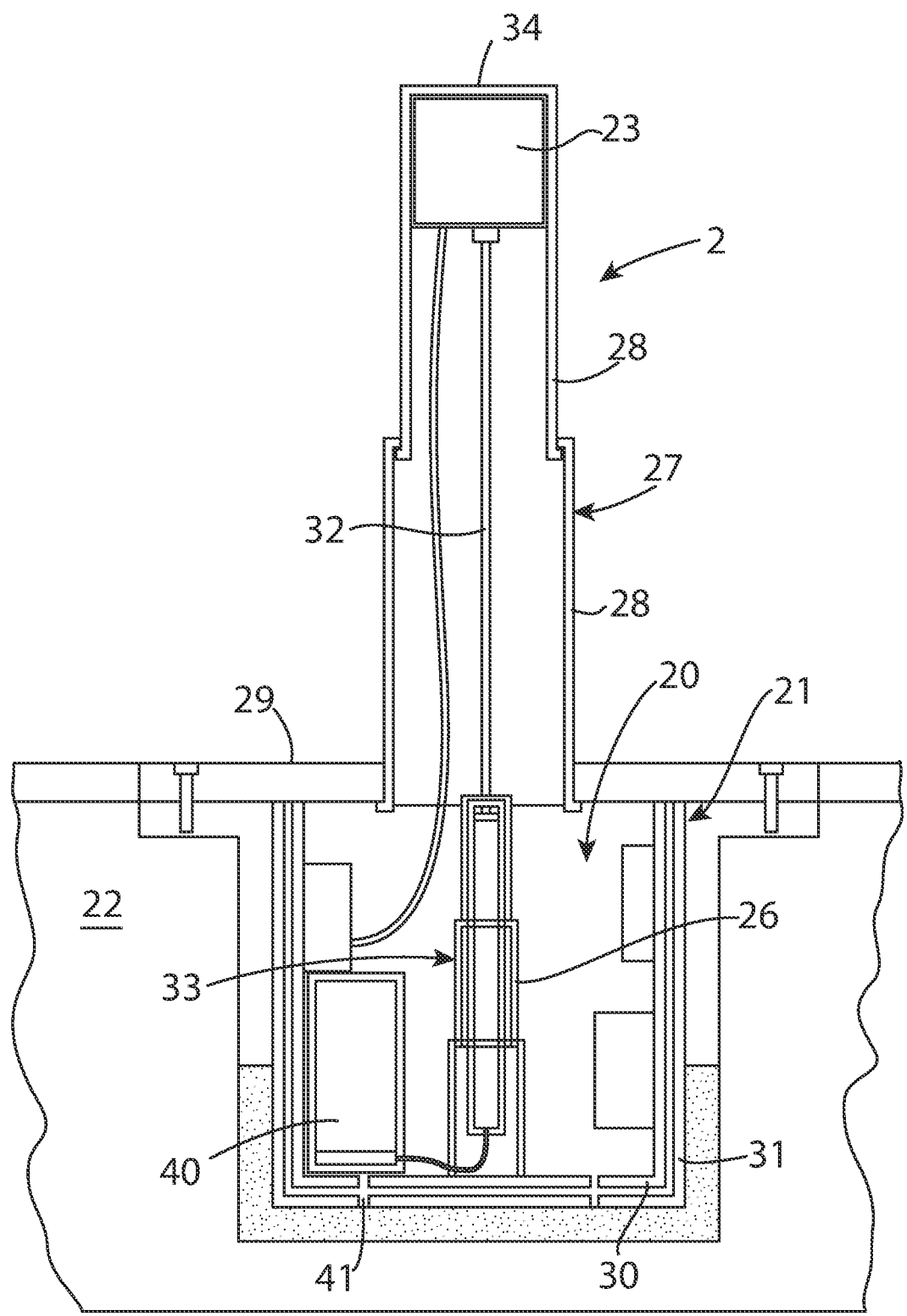
FIG. 4 is a detailed sectional diagrammatic of the charging station of FIG. 2.
Figure 5:
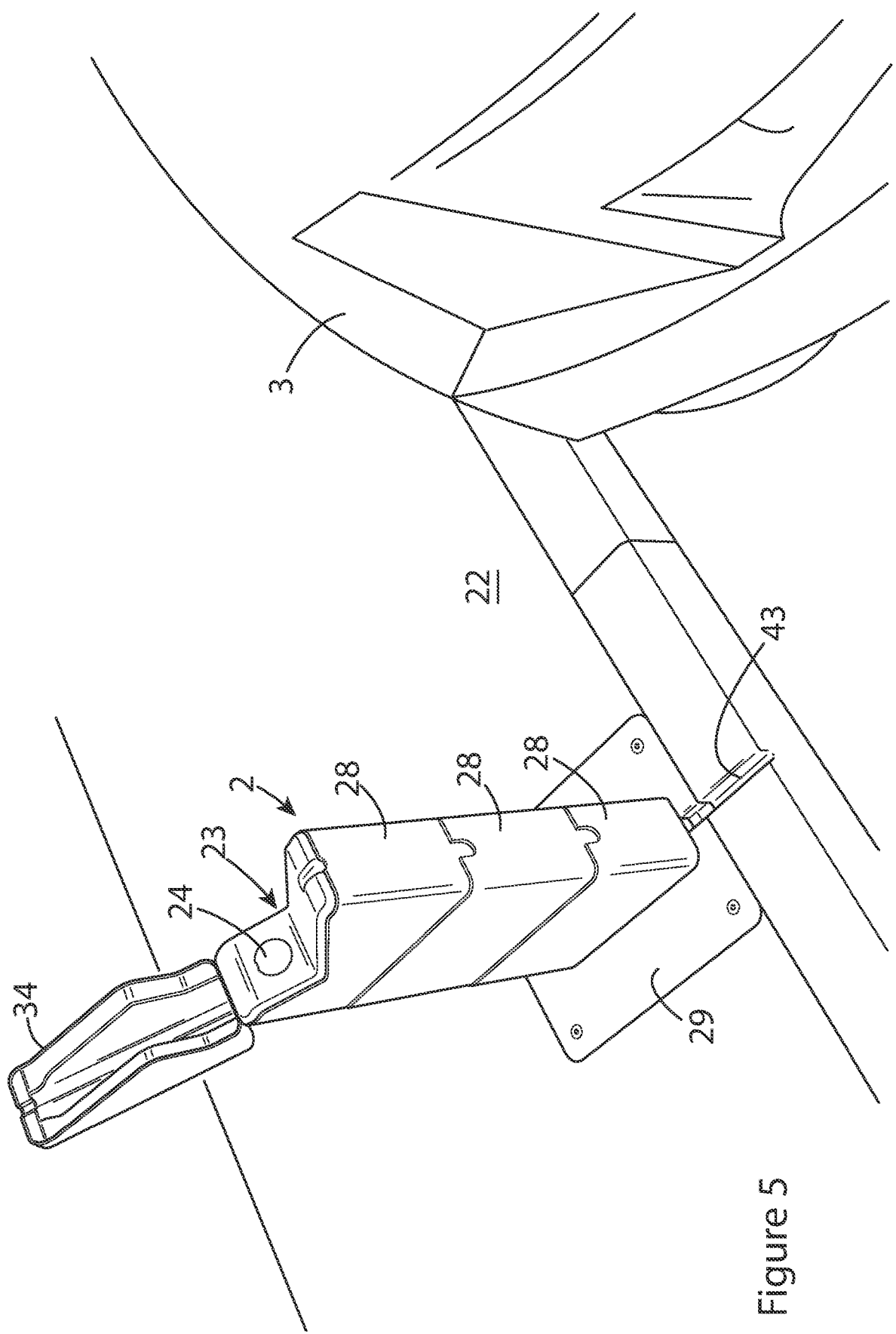
FIGS. 5 to 7 are stylised schematics of the charging station according to the invention.
Figure 6:
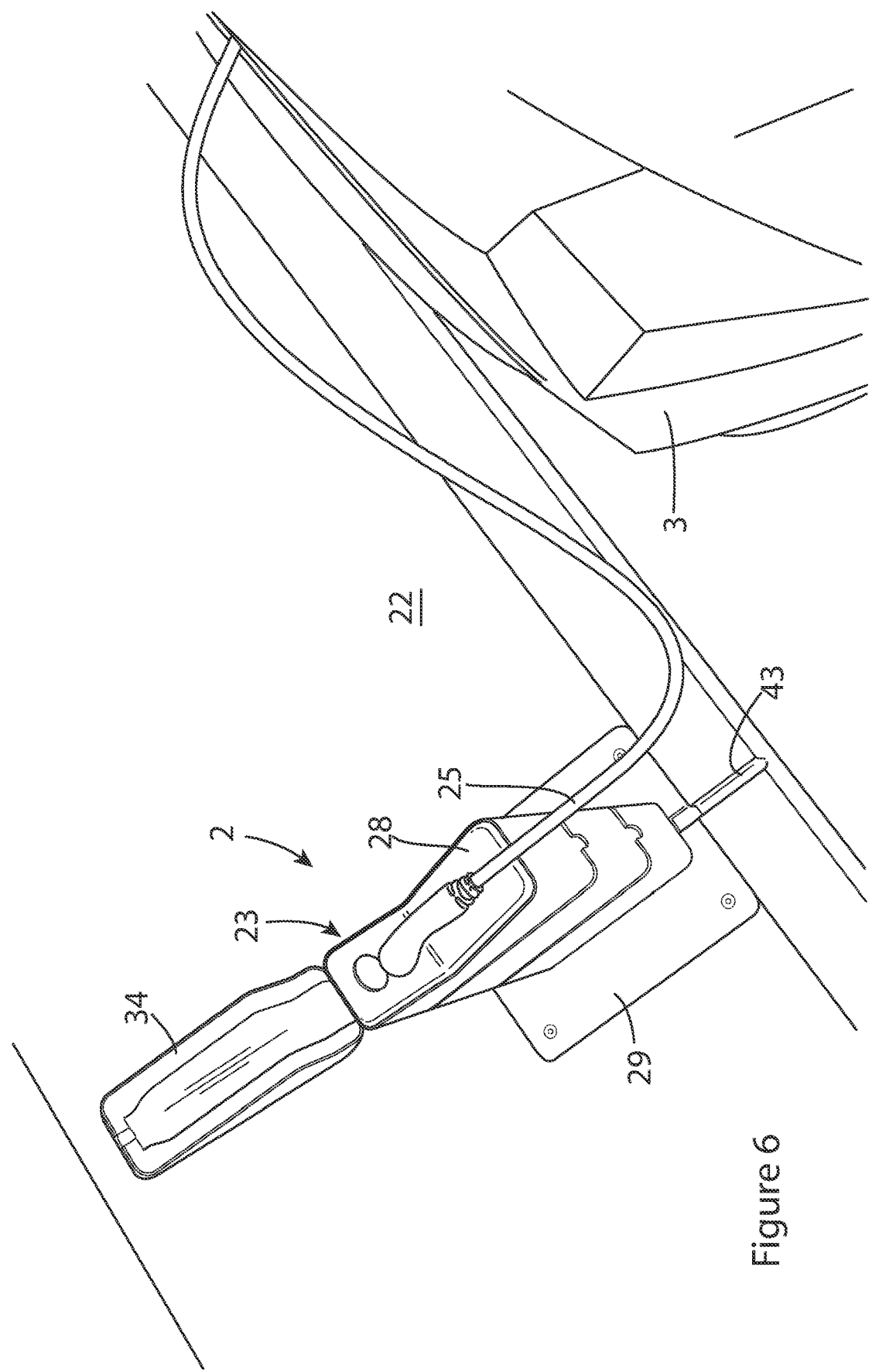

The charging portion 23 moves to the second position above the surface level of the substructure 22 in a housing 27. The housing 27 includes a cover 29, whereby, as shown in FIG. 2, the cover 29 is flush with the substructure 22 in both the first and second position.

The housing 27 is provided as a telescoping pillar or column operable under the action of the lifting means 26 to extend from the base portion 21 when the charging portion 23 is in the second position. As shown, the housing moves in a substantially vertical direction upward from the base portion 21. In the instance shown, the housing 27 includes an arrangement of inter-fitting nested shell structures 28 operable to collapse into one another as the charging portion 23 is retracted and moved from the second position to the first position to thereby be fully contained within the base portion 21. The housing 27 and charging portion 23 are stored in the base portion 21 within the substructure when the charging portion 23 is in the first position.

The housing 27 includes a lid 34 operable when open to provide access to the electrical outlet 24 of the charging portion 23. A lid closure sensor 17 is operable to detect that the lid is closed, and the charging portion 23 will start lowering under the action of the lifting means 26 and charging when the lid 34 is detected as being closed. The lid 34 of the charging portion 23 is flush with the surface of the substructure 22 when the charging portion 23 is located in the base portion 21 in the first position.

The housing 27 includes multiple interconnected segments or shell structure 28 that collapse into each other to reduce the overall depth of the charging station 2. There is also a gap between the segments 28 along the majority of the perimeter with localised sliding tracks between the segments 28 to reduce the risk of the telescopic shell from jamming. When retracted, the housing 27 will transmit any loads directly to the shell structure 28 below, protecting the lifting means 26 and the electronics from any force. This will also increase the stability to bear weight exerted on the charging station from above the substructure, such as should a person step onto the lowered charging station 2.

Figure 7:
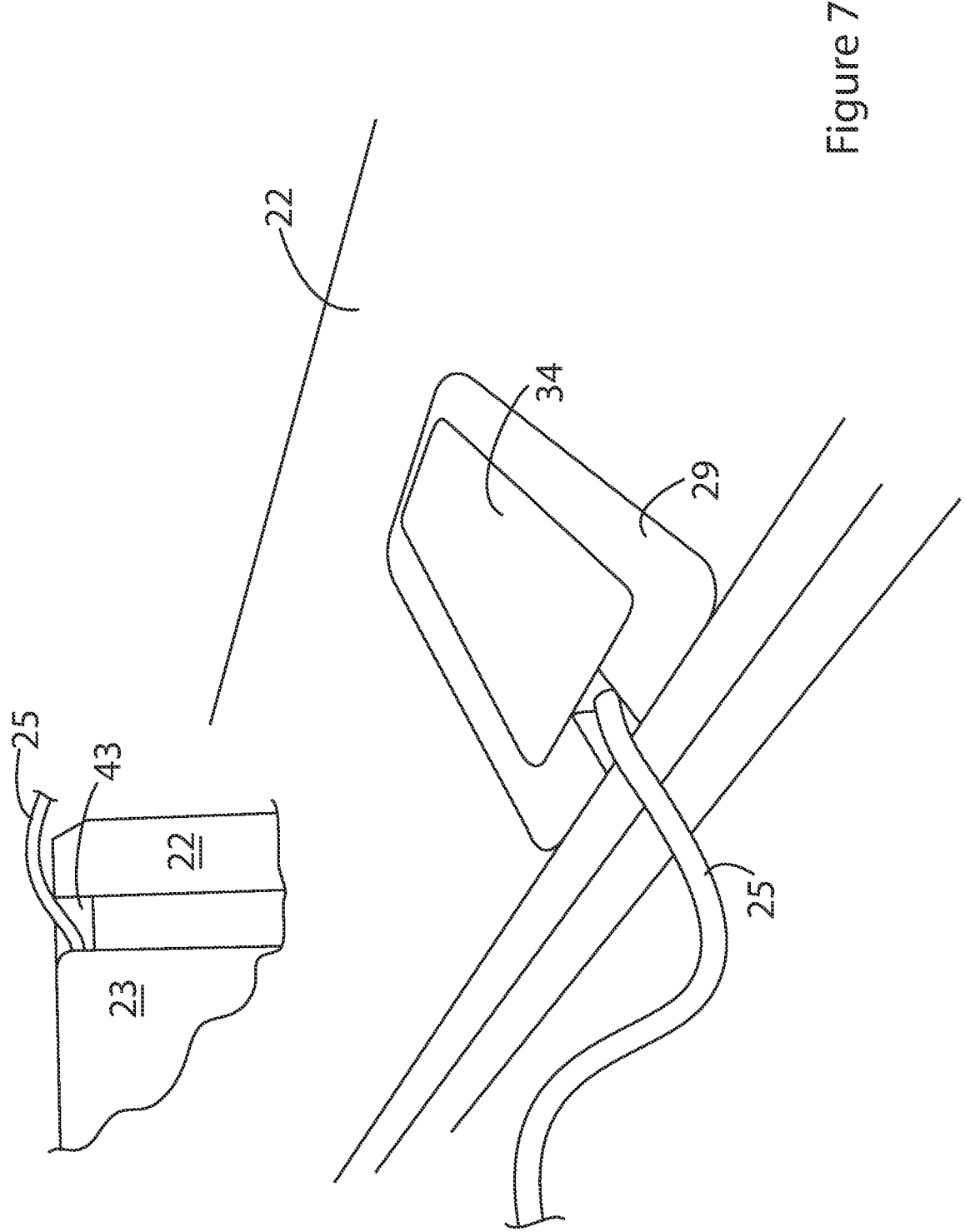

As shown in FIG. 7, the charging cable 25 will emerge from the side of the charging station 2 towards a kerbside or other structure depending on the nature of the substructure 22. A channel 43 is provided in the substructure 22 for the charging cable 25 will enable the cable 25 to emerge onto the road without being exposed to the top surface of the pavement reducing the trip hazard. Modifying the kerb stone may be required as necessary to mitigate the trip hazard. Alternatively, the cover 34 may include a raised platform to allow the cable 25 to emerge onto the road without affecting the kerb stone. A steady incline to the raised platform will reduce the risk of tripping. Alternatively, a channel provided for the cable 25 to extend through a side of the charging station 2 in the second position will enable the cable 25 to emerge and come to rest above the top of the substructure 22.

Figure 10:
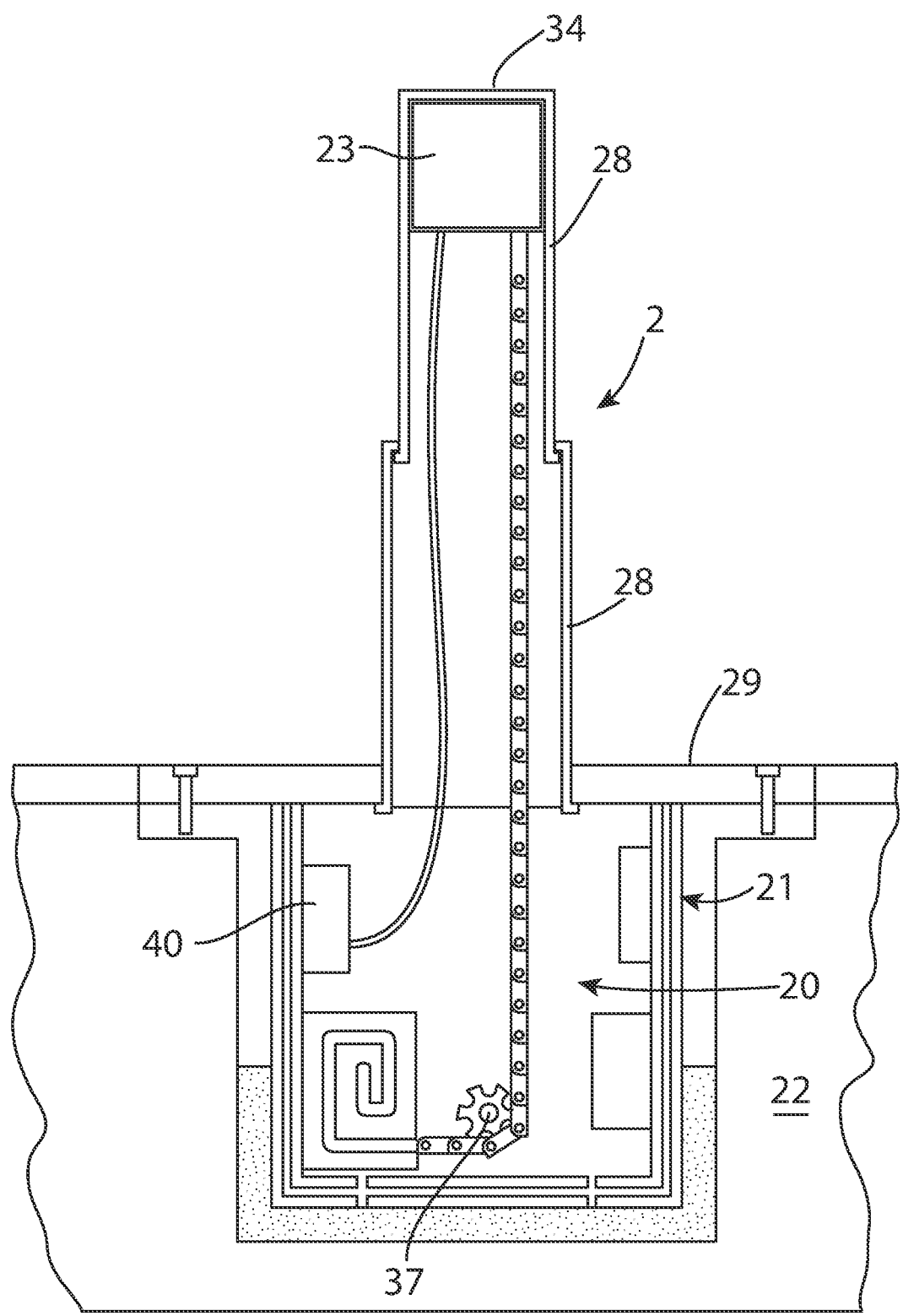
FIGS. 10 to 12 show alternative lifting means according to the invention.
Figure 11:
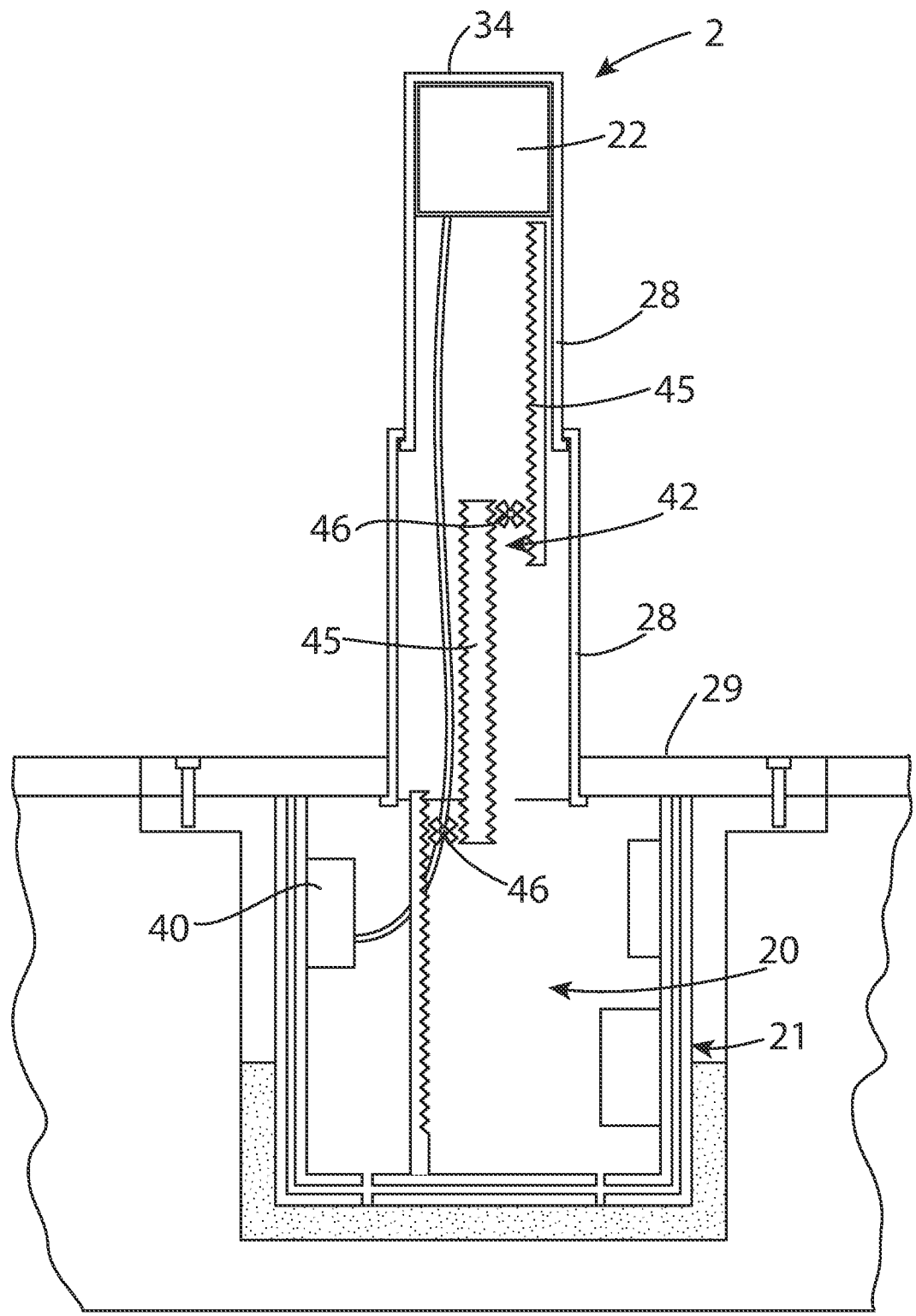
Figure 12:
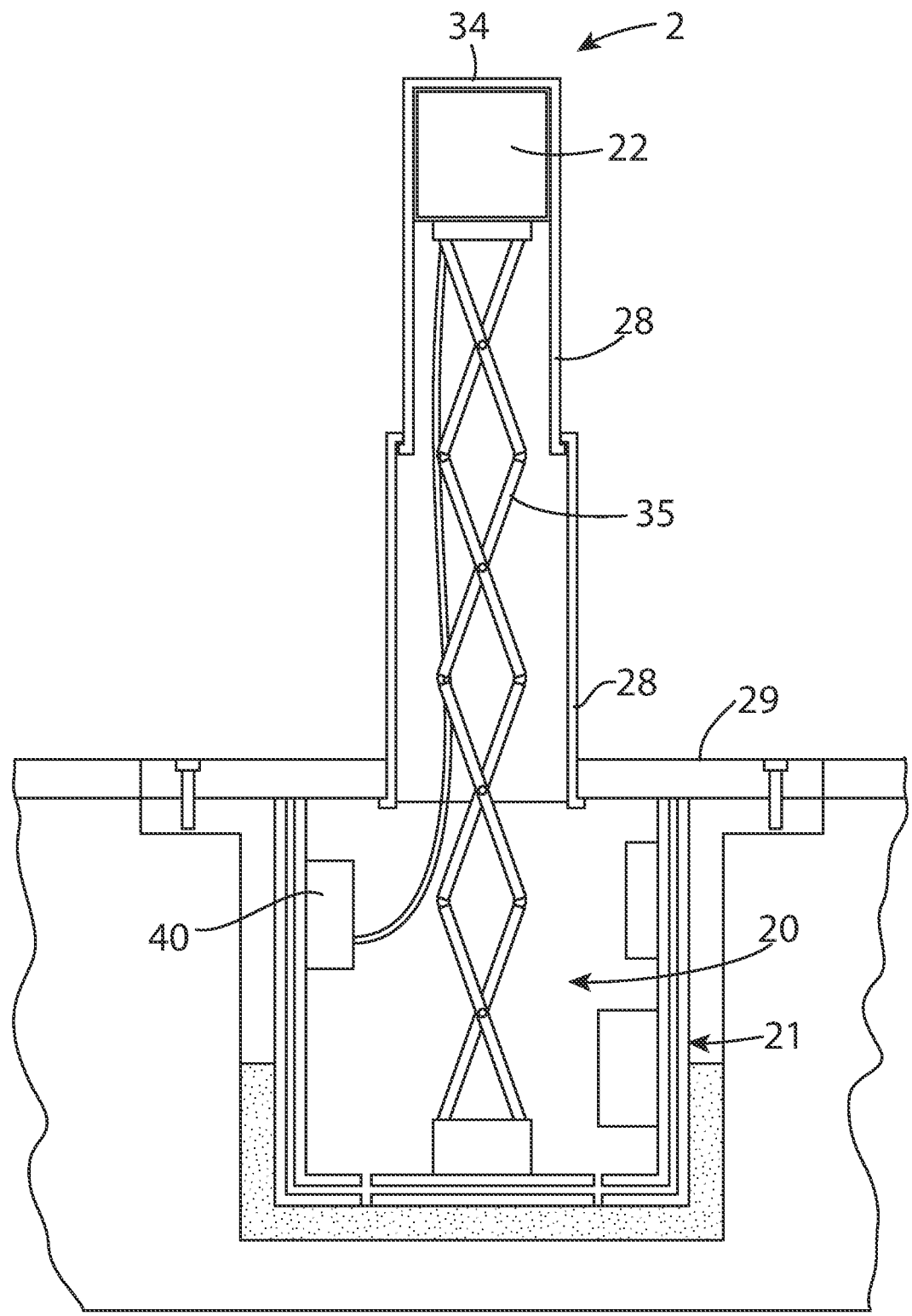

In the instance shown, the lifting means 26 is provided by a telescopic hydraulic cylinder including piston 32 and cylinder(s) 33 that is operable when actuated by a pump 40 to move the charging portion 23 between the first and second position. However, it will be understood that the lifting means 26 may be provided as using pneumatic means, such as a telescopic pneumatic cylinder, or by a rigid chain link mechanism 37 (FIG. 10), rack and pinion 42, including a rack 45 and pinion 46 devices (FIG. 11), a scissor lift mechanism 35 (FIG. 12), or other lifting device or combination thereof. Use and reference to a telescopic hydraulic cylinder 32, 33 is thus shown by way of example and should not be seen as limiting.

According to the invention, a lifting controller 36 is provided to activate the lifting means 26 to move the charging portion 23 between the first position and second position. Although the lifting controller 36 is shown in the charging station 2 it will be understood that such control means may be provided separately of the station, such as in junction box 5, or control panel 4. The charging controller 11 is operable to activate the charging station to charge the vehicle when the charging portion is in the second position. Charge controller 11 is operable to regulate and provide power to charge the vehicle when the charging portion 23 is in the first position in the base portion 21, which is when the cover 29 of the station 2 is flush with the substructure 22 and the charging station 2 is retracted into the substructure 22. The charge controller 11, although shown in the junction box 5 in FIG. 1, may instead be provided in the charging station 2.

A force sensor 12 or proximity sensor is provided to detect if an obstacle is positioned above or on the charging station 2, whereby if an obstacle is detected then the charging portion 23 is not moved from the first position to the second position by the lifting means 26. Such a force sensor 12 may optionally be provided on the lid 34 of the charging station 2. Alternatively, or additionally, a force sensor 12 may be provided on the pump 40 to the hydraulic cylinder 33 to detect when the force required to move the charging portion 23 to the second position is abnormal, indicating a fault or obstruction.

The charging station 2 includes a water/flood sensor 16, whereby when water is detected within or on the charging station 2 (such as during rain fall, a flooding event or some other water/moisture related event) the lifting controller 36 is operable to activate the lifting means 26 to automatically move and/or maintain the charging portion 2 in the second position above the substructure 22 and the charging controller 11 is operable to activate the charging station 2 to enable the vehicle 3 to be charged, and to continue to be charged if charging is underway, when the charging portion 2 is moved to the second position, when water is detected within, adjacent or in the ambient surrounding the charging station 2. The water/flood sensor 16 will therefore detect when the main body 20 of the charging station 2 is receiving water, and will, when water is detected signal the lifting controller 36 to activate the lifting means 26 to automatically raise the charging portion 23 to the second position, which will rise above and out of the substructure to avoid the electrical outlet 24 being in contact with or submerged in water.

Importantly, the charging station 2 will facilitate and permit charging of a vehicle 3 when in the second position above the substructure and the charging portion 23 will be maintained in the second position above the substructure 22 and enable a vehicle to be charged in this configuration of the charging station during rain fall, a flooding event or some other water/moisture related event. A lifting alert substation may emit an alert displayed on the control panel 4 asking the user if the charging station 2 is clear to rise.

A water pump 14 is provided and is operable to pump out and remove water from within the main body 20 and other parts of the charging station 2. Drain holes 41 are provided in the base portion 21 to enable water to drain out of the charging station 2.

The control panel 4 includes an interactive user interface 18. The interactive user interface 18 may be provided at a fixed structure, such as a physical pillar, located near the charging station 2 or on an application executing on a computer processor enabled device, such as a laptop, smart mobile phone, computer tablet or pad or other suitable device. A processor operable at the fixed structure provides a mounting for processor means, the interactive user interface 18 and control electronics 19. The lifting controller 36 of a charging station 2 is operable in response to signals from the control panel 4 to activate the lifting means 26 to move the charging portion of the charging station 2 between the first position and second position and to activate the charging station 2.

The charging portion 23 is also moved to the raised second position in response to user input provided to the user interface 18 to cease charging the vehicle, thereby providing the user with the opportunity to access and remove the charging cable from the outlet 24.

In operation, each charging station 2 may be provided with an identifier, such as a number, and a user may interact with the interactive user interface 18 to select a specific charging station 2 by keying in the identifier to thereby activate the charging station 2. A user may interact with the user interface 18 to select the quantity of charge being purchased, and a "fill it up" option is provided to enable users to select that the vehicle battery is to be fully charged.

A user may at any stage of the charging process request that charging is stopped so that the charging portion 23 of the charging station 2 is moved from the first position to the second position to provide access to the charging cable 25 so that it may be unplugged from the outlet 24 thereby stopping the charging process.

The user interface 18 includes a payment option to enable users to pay for the charging facility. The control panel 4 provided on a fixed structure, such as a pillar, includes payment facilities, such as contactless, card and coin/cash options to pay for the charging facility. A user may also hold a dedicated user account to facilitate payment or use online payment options, such as with a debit or credit card.

Each charging station 2 includes a visible indicator which changes colour to show that charging of a vehicle has begun when the charging cable of the vehicle is plugged into the electrical outlet 24 of the charging station 2.

FIG. 8 illustrates a charging system 1 and a charging station 2 in use according to the invention as steps (i) to (ix).

Step (i) show the system 1 and station 2 awaiting a user, and the substructure 22 is provided as a footpath. Step (ii) shows a user arriving in an electric or hybrid vehicle 3 and optionally interacting with control panel 4 or via an application executing on a processor, such as Smart phone, tablet or the like, of the user. As shown in step (iii) the charging portion 23 of the charging station 2 rises to the second position above the level of the substructure 22. At step (iv) the user plugs a charging cable 25 into the charging socket of the car 3 and the supply outlet 24 of the charging portion 23. At step (v) the charging portion 23 lowers back to the first position in the base portion and within the substructure 22. As shown in step (vi) the vehicle is charging and the charging portion 23 of the charging station 2 is retracted into the base portion and is below the surface of the substructure 22. The cover 34 of the charging station 23 is now substantially flush with the footpath. At step (vii) charging is complete and the charging station moves back or rises to the first position. At step (viii) the user unplugs the cable 25 from the vehicle 3 and charging station 2, and at step (ix) the charging station is lowered back into the base portion and so that the cover thereof is flush with the substructure.

FIG. 9 is a sectional diagrammatic showing the installation of the charging station 2 according to the invention in which a pre-assembled charging station 2 is placed on gravel 50 in an excavated hole 51 in the substructure 22. A channel running from the control panel 4 to the charging stations 2 is excavated to run power and communication cables to and between the control panel 4 and charging stations 2. After levelling the charging stations 2, additional gravel and concrete are added at the sides to secure the charging stations 2 in each hole 51.

A cover 29 is placed on top and bolted to the surface of the substructure 22, the cover 29 having an opening through which the charging portion 23 of the main body 20 may move. The housing 27 is split into interlocking inner housing 30 and outer housing 31. When servicing the or each charging station 2, the cover 29 is removed and the inner housing 30 lifted allowing easy access.

Power and communication cables are coupled between the junction/distribution box 11 to the socket outlet 24, the controller 36 and sensors, pumps and other electrically powered parts of the charging station 2. A cable energy chain may be used for to allow for the movement of coupled cables in a controlled fashion. Where this is not feasible, a coiled cable may allow the cables to flex without the risk that the cable becomes taut and breaking. The terminals of the cables will be connected to the electronics enclosures via IP68 rated panel mounted connectors. Each charging station is sealed as necessary with internal components incapable of being exposed to water secured in enclosures, such as IP68 rated enclosures.

The charging outlet 24 of the charging station 2 together with a user's handle are protected in a sealed and accessible compartment reducing the chance of water entering. Drainage holes inside the compartment will allow water to drain. When the charging outlet 24 socket is not in use, an additional spring-loaded cover seals off the socket pins.

A moisture sensor 13 will ensure the integrity of the waterproof enclosure such that if moisture is detected, the electrical supply to the charging station 2 may be cut so that and the power to the charging station 2 is deactivated.

Aspects of the present invention have been described by way of example only and it should be appreciated that additions and/or modifications may be made thereto without departing from the scope thereof as defined in the appended claims.

What is claimed is:

1. A charging station for charging a battery of an electric or hybrid vehicle at rest at a ground level, said charging station including:
   a main body having a base portion positioned below said ground level and a charging portion, wherein said charging portion includes an electrical outlet for connection to said vehicle,
   lifting means for moving said charging portion between a first position in which said charging portion is located in said base portion below said ground level, and a second position in which said charging portion is in a raised location out of said base portion and above said ground level,
   a lifting controller to activate said lifting means to move said charging portion between said first position and said second position,
   wherein said charging station includes a control panel that is operated via a user interface to provide access to said charging station, and
   wherein said lifting controller is operable in response to said control panel to activate said lifting means to move said charging portion of said charging station from said first position below said ground level to said second position fully above said ground level to provide access to said electrical outlet, and to move said charging portion from said second position to said first position within said base portion below said ground level,
   wherein, when in said first position below said ground level said charging portion is activated to charge said vehicle connected to said electrical outlet.

2. The charging station as claimed in claim 1, in which said first position of said charging station is substantially flush with said ground level and no part of said charging station is above said ground surface.

3. The charging station as claimed in claim 1, in which said charging portion is moved to said second position in response to user input provided to said user interface to cease charging said vehicle.

4. The charging station as claimed in claim 1, in which said charging portion moves to said second position in a housing and said housing includes a lid, wherein said lid is flush with said ground level when said charging portion is in said base portion in said first position, and said housing and said charging portion are stored in said base portion below said ground level when said charging portion is in said first position.

5. The charging station as claimed in claim 4, in which said lid of said housing is operable when open to provide access to said electrical outlet of said charging portion and includes a lid closure sensor that is operable to detect that said lid is closed, wherein said charging portion will start lowering to said first position and charging said vehicle when said lid has been detected as being closed.

6. The charging station as claimed in claim 5, in which said housing is provided as a telescoping pillar operable to extend from said base portion when said charging portion is in said second position.

7. The charging station as claimed in claim 4, in which said housing includes an arrangement of inter-fitting nested shell structures operable to collapse into one another as said charging portion moves from said second position to said first position.

8. The charging station as claimed in claim 1, including a water sensor for detecting water, wherein said water sensor triggers said lifting controller to move and maintain said charging portion in said second position above said ground level and said charging controller is operable to activate said charging station to charge said vehicle when said charging portion is in said second position.

9. The charging station as claimed in claim 1, further including a water pumping means to drain said main body of said charging station.

10. The charging station as claimed in claim 1, in which drain holes are provided in said base portion to drain said charging station.

11. The charging system as claimed in claim 1, in which said user interface is provided at a fixed structure located near said charging station.

12. A charging system as claimed in claim 11, in which said user interface is provided on an application executing on a computer processor enabled device, wherein said computer processor enabled device is selected from a group consisting of laptop computers, smart mobile phones, computer tablets and computer pads.

13. The charging system as claimed in claim 11, in which said charging station is provided with an identifier and can be selected by said identifier using said user interface.

14. A charging system as claimed in claim 11, in which said control panel includes payment facilities to pay for use of said charging station.

\* \* \* \* \*